(12) United States Patent
Nagae et al.

(10) Patent No.: US 6,592,164 B2
(45) Date of Patent: Jul. 15, 2003

(54) AUTOMOTIVE EXTERIOR MEMBER MOUNTING CONSTRUCTION AND AUTOMOBILE

(75) Inventors: Akira Nagae, Aichi (JP); Hiroyuki Kobayashi, Aichi (JP); Tomoshi Uesaki, Okayama (JP)

(73) Assignees: Mitsubishi Jidosha Kogyo Kabushiki Kaisha, Tokyo (JP); Suiryo Plastics Co., Ltd., Okayama (JP)

( * ) Notice: Subject to any disclaimer, the term of this patent is extended or adjusted under 35 U.S.C. 154(b) by 0 days.

(21) Appl. No.: 10/162,878

(22) Filed: Jun. 6, 2002

(65) Prior Publication Data

US 2003/0015882 A1 Jan. 23, 2003

(30) Foreign Application Priority Data

Jun. 6, 2001 (JP) ........................................ 2001-171238

(51) Int. Cl.[7] .............................................. B62D 27/00
(52) U.S. Cl. ...................... 296/29; 296/39.1; 293/128
(58) Field of Search .......................... 296/29, 194, 204; 293/155, 102, 120, 121, 122, 154; 428/31; 114/219; 52/716.6; 280/505

(56) References Cited

U.S. PATENT DOCUMENTS

| | | | | |
|---|---|---|---|---|
| 2,817,131 A | * | 12/1957 | Seegers ........................ 24/618 |
| 3,572,799 A | * | 3/1971 | Truesdell et al. .......... 52/716.7 |
| 4,039,215 A | * | 8/1977 | Minhinnick ................ 52/716.7 |
| 4,103,400 A | * | 8/1978 | Munse ........................ 52/716.7 |
| 4,115,974 A | * | 9/1978 | Purcell ........................ 296/191 |
| 4,170,855 A | * | 10/1979 | Murray et al. ............. 52/716.6 |
| 4,363,839 A | * | 12/1982 | Watanabe et al. .......... 52/716.7 |
| 4,366,530 A | * | 12/1982 | Milhous ...................... 296/187 |
| 4,388,355 A | * | 6/1983 | Ikemizu ..................... 52/716.7 |
| 4,607,877 A | * | 8/1986 | Shelton ....................... 296/191 |
| 4,775,559 A | * | 10/1988 | Kanamori ..................... 428/31 |
| 4,869,937 A | * | 9/1989 | Nagata et al. ................ 428/31 |
| 4,875,728 A | * | 10/1989 | Copp et al. ................. 293/126 |
| 4,895,406 A | * | 1/1990 | Goesse et al. .............. 293/102 |
| 4,917,426 A | * | 4/1990 | Copp .......................... 293/142 |
| 5,169,189 A | * | 12/1992 | Haberle et al. ............ 52/716.6 |
| 5,186,509 A | * | 2/1993 | Tyves ......................... 293/128 |
| 5,202,172 A | * | 4/1993 | Graf ............................ 293/128 |
| 5,353,571 A | * | 10/1994 | Berdan et al. ............. 52/716.7 |
| 5,368,903 A | * | 11/1994 | Trier .......................... 293/128 |
| 5,433,498 A | * | 7/1995 | Ishiwata ..................... 296/39.1 |
| 5,639,522 A | * | 6/1997 | Maki et al. ................. 293/128 |
| 5,957,512 A | * | 9/1999 | Inada et al. ................. 293/102 |
| 6,095,594 A | * | 8/2000 | Riddle et al. ............... 296/191 |
| 6,186,583 B1 | * | 2/2001 | Martin .................. 296/203.02 |
| 6,276,109 B1 | * | 8/2001 | Hingorani et al. .......... 52/716.7 |
| 6,308,488 B1 | * | 10/2001 | Hoshino .................... 52/716.6 |
| 6,422,643 B1 | * | 7/2002 | Pease ........................... 296/29 |
| 6,533,347 B2 | * | 3/2003 | Sanada ......................... 296/29 |
| 2002/0149221 A1 | * | 10/2002 | Palmer et al. ................ 296/29 |
| 2002/0163216 A1 | * | 11/2002 | Delavalle et al. ............ 296/29 |

* cited by examiner

Primary Examiner—Kiran Patel
(74) Attorney, Agent, or Firm—Birch, Stewart, Kolasch & Birch, LLP

(57) ABSTRACT

A recessed portion is formed partially in an outer panel. The recessed portion has an inner wall which inclines slightly downwardly toward the inside of a body and an inner-most wall extending vertically. A retaining member is mounted on the inner-most wall. Formed on the retaining member is a locking face confronting the inner wall and a raised portion. A flange portion is provided on a bumper face. The flange portion is formed into a tapered configuration in which the thickness thereof decreases as it extends toward a distal end thereof and has a lock hole formed at a position corresponding to the raised portion. The flange portion is held between the locking face and the inner wall and is locked on the locking face by fitting the raised portion in the lock hole.

4 Claims, 3 Drawing Sheets

US 6,592,164 B2

AUTOMOTIVE EXTERIOR MEMBER MOUNTING CONSTRUCTION AND AUTOMOBILE

BACKGROUND OF THE INVENTION

1. Field of the Invention

This invention relates to a mounting construction for mounting an exterior member such as an automotive bumper face to the body of an automotive vehicle and an automobile.

2. Background Art

Bumper mounting constructions employing retaining members such as clips for fixing an automotive bumper (also referred to as a bumper facer or bumper cover) to the body of an automobile are proposed in, for example, Japanese Utility Model Application, First Publication Nos. Hei6-45870U or Hei3-44054, or Japanese Patent Application, First Publication No. 2000-52900. In these conventional bumper mounting construction, retaining members (clips) are mounted on one of a bumper face and the body of a vehicle, and the retaining members are brought into engagement with engagement portions formed in the other, so that the bumper face is mounted on the vehicle at a predetermined position.

According to the construction of the conventional bumper mounting constructions, however, since an outer panel on the body of the vehicle and the bumper face are not directly positioned relative to each other, it has been difficult to regulate the position of an edge portion of the bumper face relative to the outer panel with high accuracy. For example, there are generated a gap or difference in level between the outer panel and the edge portion of the bumper face, this often leading to the deterioration in the appearance of the vehicle.

In addition, according to the bumper mounting constructions in which the bumper face is mounted in a recessed portion in the outer panel with the conventional holding members such as clips, when there occurs a need to remove the bumper face from the vehicle body it has been difficult to perform the removal of the bumper face from the outside of the vehicle body, and therefore, there has been a demand for improvement in efficiency of the removing work.

SUMMARY OF THE INVENTION

Thus, an object of the invention is to provide a mounting construction for mounting an automotive exterior member such as a bumper face at a predetermined position on an outer panel with good accuracy. Another object of the invention is to provide an automobile having such a mounting construction for mounting an automotive exterior member. Additionally, the other object of the invention is to facilitate the removal of the exterior member so mounted.

According to a first aspect of the invention, there is provided an automotive exterior member mounting construction in which an exterior member and an outer panel are locked together in a state in which a flange portion of the exterior member is held between an inner wall of a recessed portion of the outer panel and a locking face of an retaining member, whereby the outer panel and the flange portion are allowed to be positioned directly relative to each other. Moreover, since the flange portion is shaped such that the thickness thereof reduces toward a distal end thereof, the distal end of the flange portion can easily be inserted in a gap between the inner wall and the retaining member.

According to a second aspect of the invention, when the flange portion is inserted between the inner wall and the locking face a raised portion fits in a lock hole, whereby the flange portion is prevented from being disengaged from the gap, and the position (so-called, the "protrusion") of the flange portion is regulated by this raised portion. Owing to this, the positions of an edge portion of the outer panel and an edge portion of the exterior member can be aligned with each other with good accuracy.

According to a third aspect of the invention, when there occurs a need to remove the exterior member from the retaining member displacing the exterior member slightly along a direction in which the flange portion extends allows the flange portion to climb up along an inclined guide face to finally ride on the raised portion so as to press down the raised portion, whereby the raised portion is disengaged from the lock hole. Thereafter, when the flange portion is drawn back to the outside of the vehicle the flange portion is disengaged from the retaining member.

DETAILED DESCRIPTION OF THE PREFERRED EMBODIMENTS

Referring to FIGS. 1 to 5, an embodiment of the invention will be described below.

Figure 2:
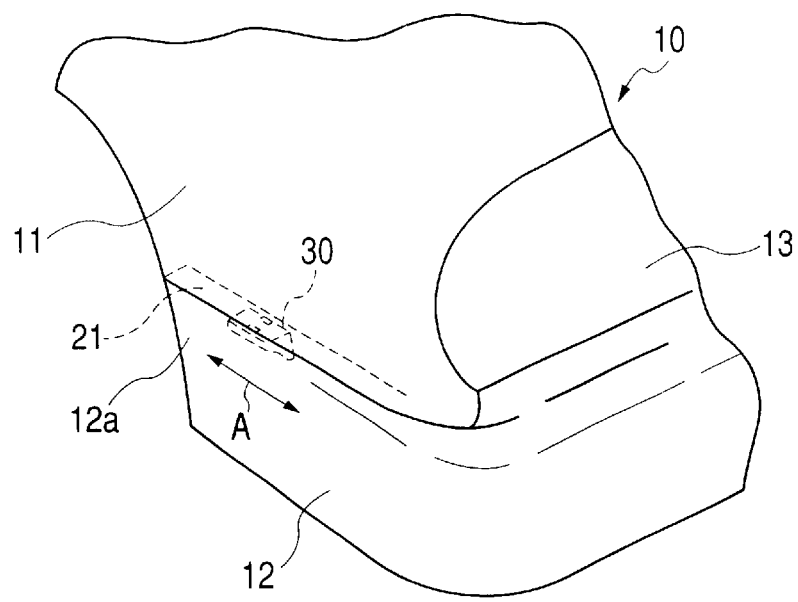
FIG. 2 is a perspective view of the part of the vehicle shown in FIG. 1.

FIG. 2 shows a part of a body 10 of a vehicle (in this case, an automobile). The vehicle comprises an outer panel 11 which constitutes the outer surface of the vehicle 10, a bumper face 12 which is an example of an exterior member, a lamp unit 13 and the like. An end portion 12a of the bumper face 12 is mounted at a predetermined position on the outer panel 11 with a retaining member 30, which will be described below. Other portions of the bumper face 12 than the end portion 12a are fixed to the body 10 with known means such bolts, and therefore, the description thereof will be omitted here.

Figure 1:
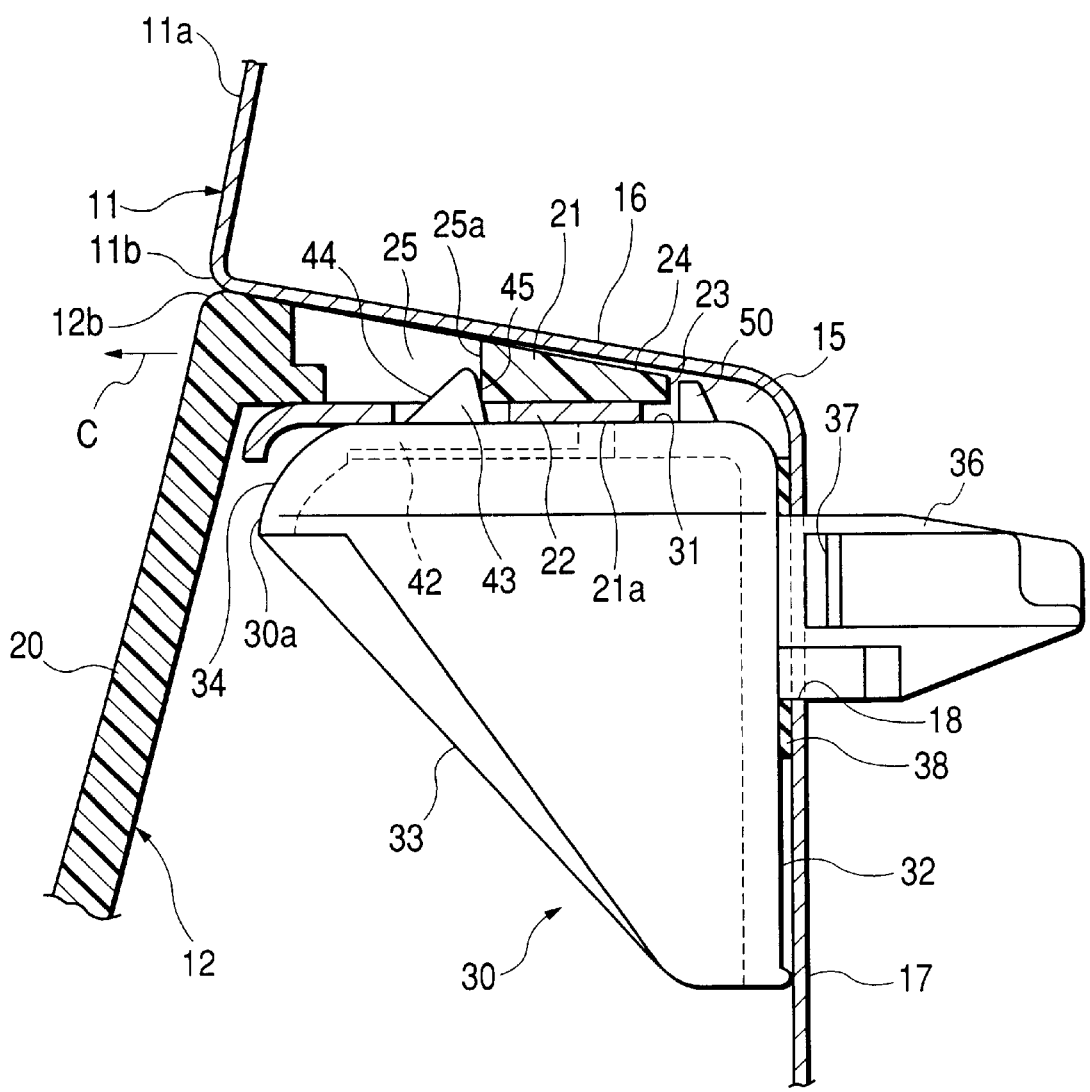
FIG. 1 is a vertical cross-sectional view of part of a vehicle showing an automotive exterior member mounting construction according to one embodiment of the invention.
Figure 3:
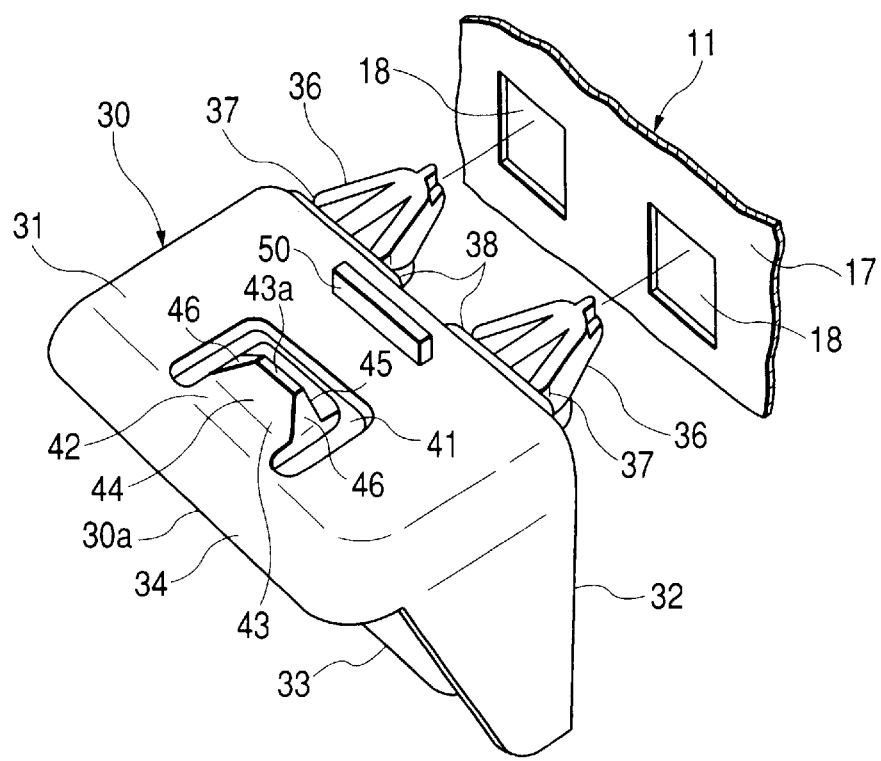
FIG. 3 is a perspective view of a retaining member for use in the automotive exterior member mounting construction shown in FIG. 1.
Figure 5:
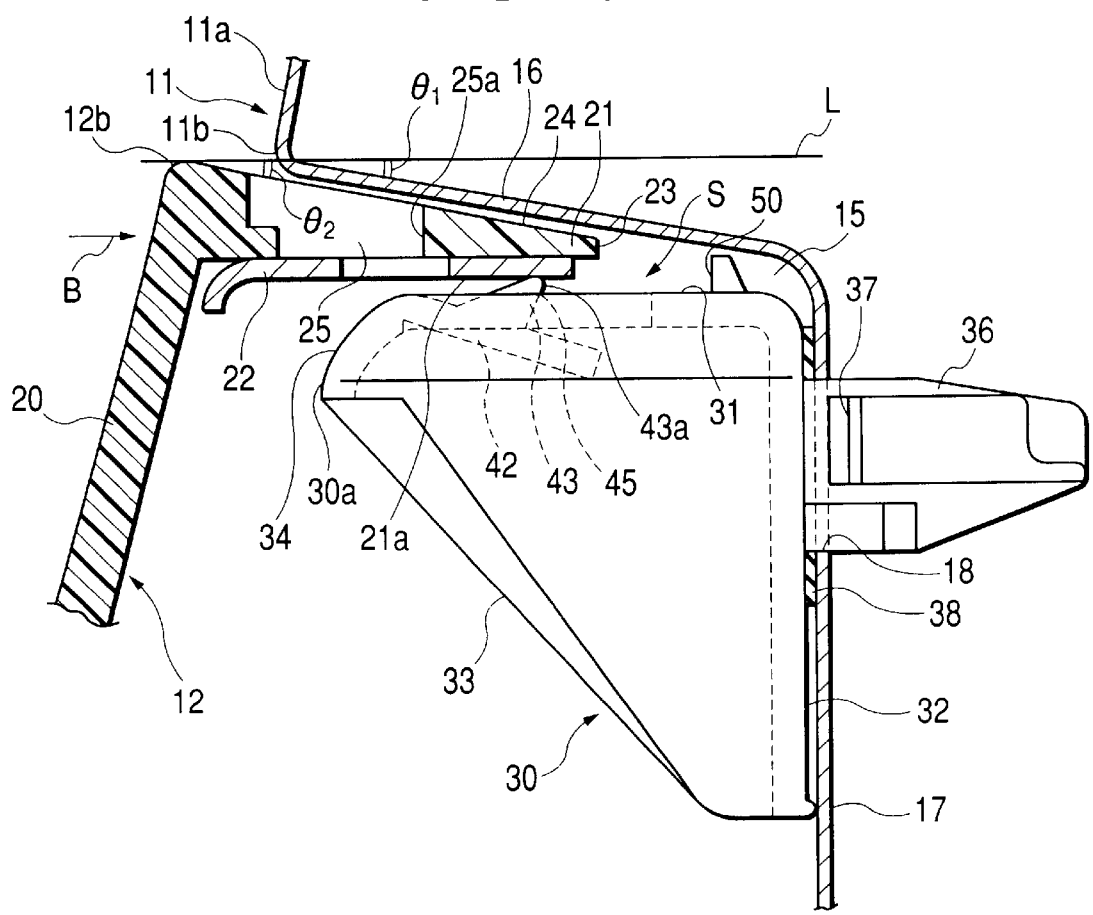
FIG. 5 is a cross-sectional view showing a state immediately before a flange portion of the exterior member shown in FIG. 1 is locked on the retaining member.

As shown in FIG. 1, a recessed portion 15 is formed in part of the outer panel 11. The recessed portion 15 has an inner wall 16 bent toward the inside of the body and an inner-most wall 17 which extends from the inner wall 16 continuously downwardly. The inner wall is bent into a configuration in which the height thereof lowers as it extends from an outer surface 11a of the outer panel 11 toward the inside of the body and inclines at an angle θ 1 relative to a horizontal line L, as shown in FIG. 5. The inner-most wall 17 extends downwardly from the inner wall 16 in substantially a perpendicular direction. A pair of left and right rectangular mount holes 18 (as shown in FIG. 3) are formed in an upper portion of the inner-most wall 17.

As shown in FIG. 1, the bumper face 12, which is made of a synthetic resin material, comprises a flange portion 21 which extends horizontally from an upper end of a bumper face main body 20 toward the inside of the vehicle. The flange portion 21 includes a reinforcement member 22 of a sheet metal which is provided on a lower side thereof. This reinforcement member 22 is provided in such a manner as to extend along a longitudinal direction of the bumper face 12 (in a longitudinal direction of the body as indicated by arrows A in FIG. 2).

The flange portion 21 is formed into a tapered configuration in which the thickness thereof reduces as the portion extends toward a distal end 23 thereof, and an inclined face 24 is formed on an upper side of the flange portion 21. As shown in FIG. 5, the inclined face 24 inclines at an angle θ 2 relative to the horizontal line L so that the height of the flange portion 21 lowers as the portion extends toward the distal end 23 thereof. The inclination angle θ 2 is greater than the inclination angle θ 1 of the inner wall 16. A lock hole 25 is formed in the flange portion 21 at a predetermined position in such a manner as to penetrate therethrough vertically. The lock hole 25 opens while confronting a locking face 31 which will be described later.

A retaining member 30 is mounted on the inner-most wall 17 of the recessed portion 15. The retaining member 30 is an integrally formed article of a synthetic material which is represented by, for example, polyacetal or nylon, and has a locking face 31 which extends substantially horizontally in a state in which it is mounted on the inner-most wall 17, a mounting face 32 which extends substantially vertically in the same state and a reinforcement rib 33. The locking face 31 confronts the inner wall 16. A guide face 34 is formed at a front part of the retaining member 30 which is curved in an arc-like fashion in such a manner that the height thereof increases as it extends toward the locking face 31.

A pair of left and right fastener portions 36 are formed on the mounting face 32. The fastener portions 36 each have an anti-disengagement portion 37 which expands in a V-shaped fashion and has spring properties. Each of the fastener portions 36 is inserted into the mount hole 18 and the retaining member 30 can be mounted on the inner-most wall 17 when the anti-disengagement portion 37 is hooked on an opening edge of the mount hole 18. A packing 38 functioning also as a damping material is provided between the fastener portion 36 and the mounting face 32.

Figure 4:
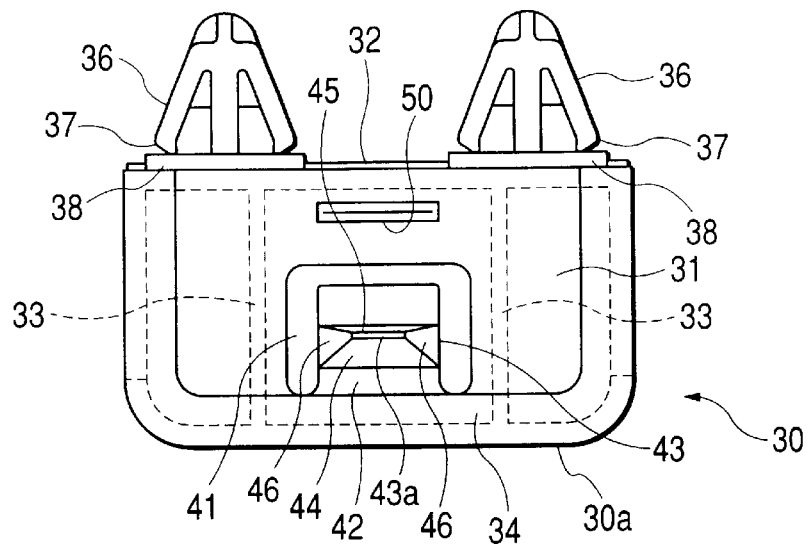
FIG. 4 is a plan view of the retaining member shown in FIG. 3.

As shown in FIG. 4, a substantially U-shaped slit 41 is formed in the locking face 32. An area inside the slit 41 constitutes a spring portion 42 which can deflect vertically as viewed in FIG. 1. A raised portion 43 is formed on an upper surface of the spring portion 42. The raised portion 43 is caused to protrude toward the inner wall 16 at a front part of the locking face 31 or a portion thereof which is approximate to the guide face 34. A front face 44 of the raised portion 43 is formed into an inclined configuration in which the height thereof increases as it extends rearward, so that a lower side 21a of the flange portion 21 slidingly rides on the raised portion 43 when the flange portion 21 is inserted into a gap S (as shown in FIG. 5) formed between the inner wall 16 and the locking face 31.

Since the spring portion 42 deflects with the raised portion 43 being pressed downwardly by the lower face 21a of the flange portion 21 when the flange portion 21 is inserted into the gap S, the flange portion 21 can be inserted deeper into the gap S. Then, when the position of the lock hole 25 reaches the raised portion 43, the raised portion 43 fits in the lock hole 25 by virtue of the elastic force of the spring portion 42. Namely, the spring properties are imparted to the raised portion 43 by the existence of the spring portion 42 which properties allow the raised portion 43 to deflect vertically.

A back side of the raised portion 43 constitutes a positioning wall 45 which rises approximately at right angles from the locking face 31 in order to prevent the flange portion 21 from moving in a direction in which the flange portion 21 is dislocated from the gap S once the raised portion 43 fits in the lock hole 25.

An inclined guide face 46 is formed on each side of the raised portion 43 (a side facing a longitudinal direction of the body) in such a manner that the height thereof increases as it extends toward an apex portion 43a of the raised portion 43. The inclined guide face 46 is inclined such that the raised portion 43 is displaced in a direction in which the raised portion 43 is disengaged from the lock hole 25 (or in a direction in which the raised portion 43 is retracted downwardly) with the lower face 21a of the flange portion 21 being allowed to slidingly ride on the raised portion 43 when the bumper face 12 is slightly deviated along one of directions in which the flange portion 21 extends (as indicated by arrows denoted by reference character A in FIG. 2).

A stopper wall 50 protruding upwardly toward the inner wall 16 is formed at a rear portion of the locking face 31, i.e., a side of the locking face 31 which is closer to the mounting face 32. The stopper wall 50 is provided at a position which allows the distal end 23 of the flange portion 21 to abut with the stopper wall 50 when the distal end 23 of the flange portion 21 is inserted into the deepest portion of the gap S so that the inserting depth of the flange portion 21 can be restricted.

Next, a process will be described in which the bumper face 12 is mounted on the outer panel 11 using the retaining member 30.

Firstly, the fastener portions 36 of the retaining member 30 are inserted into the mount holes 18 so that the retaining member 30 is mounted in the recessed portion 15 of the inner-most wall 17. As this occurs, the gap S (as shown in FIG. 5) which narrows in a tapered fashion toward the inner-most wall 17 is formed between the locking face of the retaining member 30 and the inner wall 16 of the recessed portion 15.

Thereafter, the distal end 23 of the flange portion 21 of the bumper face 12 is inserted toward the gap S in the direction indicated by an arrow denoted by reference character B in FIG. 5. Since the flange portion 21 is formed into the tapered configuration in which the thickness thereof decreases toward the distal end 23 and moreover since the guide face 34 is formed at the upper edge portion of the retaining member 30, the distal end 23 of the flange portion 21 can easily be inserted into the gap S.

While the flange portion 21 is being inserted into the gap S, as shown in FIG. 5, the raised portion 43 contacts the lower face 21a of the flange portion 21, whereby the spring portion 42 deflects in the direction in which the raised portion 43 is retracted inwardly of the locking face 31. Owing to this, the flange portion 21 can be inserted to such a position where the distal end 23 of the flange portion 21 abuts with the stopper wall 50. While the distal end 23 of the flange portion 21 is reaching the stopper wall 50 the raised portion 43 fits in the lock portion 25 by virtue of the elastic force of the spring portion 42.

The flange portion 21 is formed into the configuration in which the thickness thereof decreases toward the distal end 23, and the inclined face 24 thereof contacts the inner wall 16 of the recessed portion 15. According to this construction, when the flange portion 21 is inserted into the gap S the flange portion tries to move back in a direction indicated by an arrow denoted by reference character C in FIG. 1.

However, since the positioning wall 45 of the raised portion 43 exists against the direction, an inner face 25a of the lock hole 25 is brought into abutment with the positioning wall 45, whereby the position (protrusion) of the flange portion in the direction indicated by the arrow C can be regulated accurately.

As a result of this, the position of an edge portion of the bumper face 12 becomes substantially level with the outer surface 11a of the outer panel 11. Moreover, since the inclination angle θ 2 (shown in FIG. 5) of the flange portion is slightly greater than the inclination angle θ 1 of the inner wall 16, the edge portion 12b of the bumper face 12 can be brought into close contact with an edge portion 11b of the outer panel 11.

When the bumper face 12 is removed from the retaining member 30 the bumper face 12 is moved slightly in the longitudinal directions (the directions indicated by the arrows A in FIG. 2), whereby the lower face 21a of the flange portion 21 rides on the inclined guide face 46 of the raised portion 43, and the spring portion 42 deflects such that the raised portion 43 is retracted downwardly, the raised portion 43 being thereby disengaged from the lock hole 25. Thereafter, by only drawing the flange portion 21 this side (outwardly of the body) the flange portion 21 can be removed from the retaining member 30.

The automotive exterior member mounting construction according to the invention, which has been described heretofore, can be applied to exterior members other than the bumper face such as front and rear bumpers. In addition, it goes without saying that in carrying out the invention, the constituent elements of the invention including the specific configurations of the outer panel and the exterior member and the forms of the locking face and the raised portion of the retaining member may be modified variously without departing from the spirit and scope of the invention.

According to the first aspect of the invention, since the flange portion and the outer panel are constructed so as to be positioned directly relative to each other by holding the flange portion between the inner wall of the outer panel and the retaining member, the exterior member can be mounted at the predetermined position on the outer panel with good accuracy.

According to the second aspect of the invention, the exterior member can easily be mounted at the predetermined position on the outer panel only by inserting the flange portion between the locking face of the retaining member and the inner wall of the recessed portion in the outer panel. In addition, the positional relationship between the edge portion of the outer panel and the edge portion of the exterior member can be regulated with high accuracy.

According to the third aspect of the invention, when there occurs a need to remove the exterior member from the retaining member the engagement between the flange portion and the retaining member can be cancelled by deviating the exterior member along the directions in which the flange portion extends.

What is claimed is:

1. An automotive exterior member mounting construction comprising:

an outer panel constituting an outer surface of a vehicle and having a recessed portion, the recessed portion comprising an inner wall bent to inward of the vehicle and an inner-most wall continuously extending from the inner wall;

a retaining member mounted on the inner-most wall and having a locking face which confronts the inner wall; and an exterior member having a flange portion which extends to inward of the vehicle;

wherein the flange portion has an inclined face and tapers toward a distal end thereof reducing the thickness thereof;

the flange portion is engaged with the locking face and held between the locking face and the inner wall.

2. The automotive exterior member mounting construction according to claim 1, wherein the inner wall of the recessed portion inclines at an angle corresponding to the inclined face of the flange portion;

the flange portion has a lock hole, the lock hole facing the locking face;

a raised portion is formed on the locking face protruding toward the inner wall of the recessed portion;

the raised portion has spring properties to permit the insertion of the flange portion between the inner wall and the locking face to fit in the lock hole when the raised portion reaches the lock hole.

3. The automotive exterior member mounting construction according to 2, wherein an inclined guide face is formed on a side of the raised portion; and the flange portion rides on the inclined guide face when the exterior member is moved along a prescribed direction to displace the raised portion in a direction in which the raised portion is disengaged from the lock hole.

4. An automobile comprising:

an outer panel having a recessed portion, the recessed portion comprising an inner wall bent to inward of the automobile and an inner-most wall continuously extending from the inner wall;

a retaining member mounted on the inner-most wall and having a locking face which confronts the inner wall; and an exterior member having a flange portion which extends to inward of the automobile;

wherein the flange portion has an inclined face and tapers toward a distal end thereof reducing the thickness thereof;

the flange portion is engaged on the locking face and held between the locking face and the inner wall.

* * * * *